May 20, 1941.    J. C. WOODFORD ET AL    2,242,715
FLUID METER
Filed Aug. 17, 1939    2 Sheets-Sheet 2
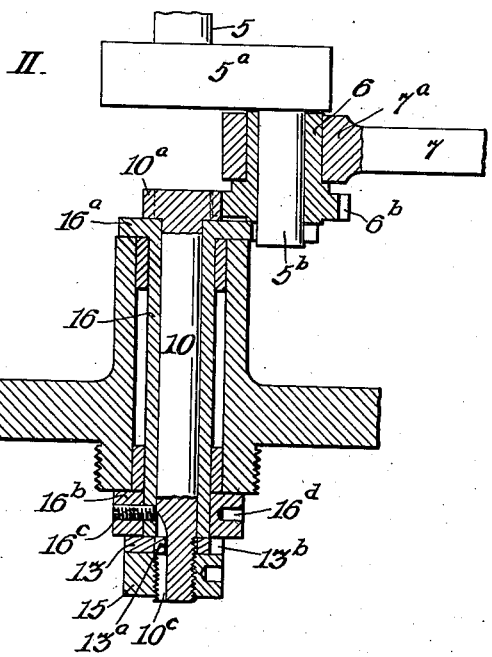
FIG. II.
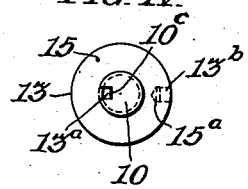
FIG. IV.
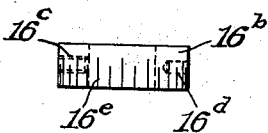
FIG. V.
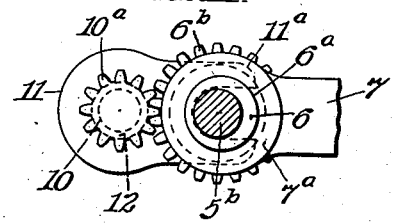
FIG. III.
Inventor
JOSEPH C. WOODFORD,
JOSEPH E. FERNLY,
By
Arthur E. Paige
Attorney Patented May 20, 1941

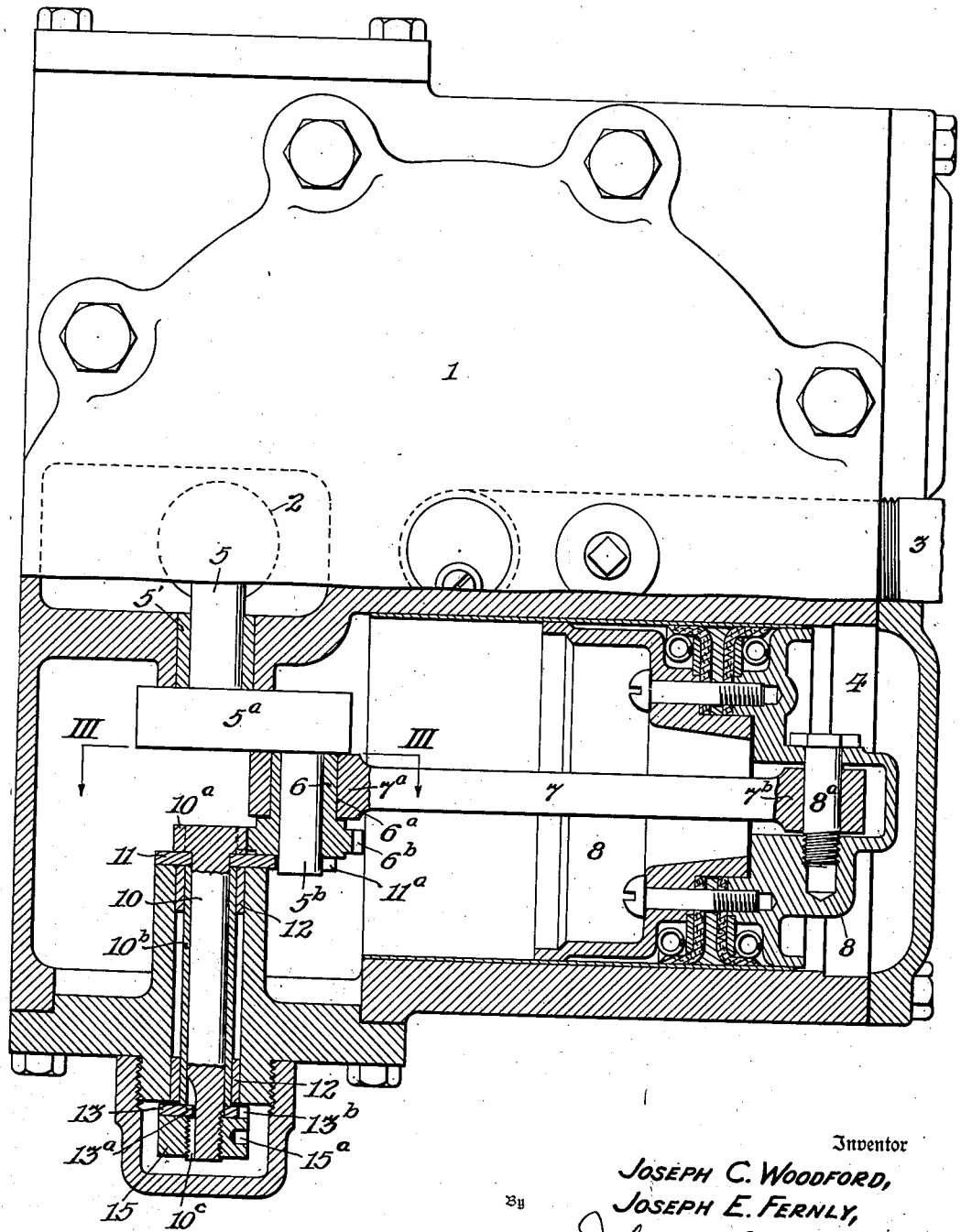
FIG. I

2,242,715

UNITED STATES PATENT OFFICE 2,242,715

FLUID METER

Joseph C. Woodford, Wayne, and Joseph E. Fernly, Conshohocken, Pa., assignors to John Wood Manufacturing Company, Inc., Conshohocken, Pa., a corporation of Delaware Application August 17, 1939, Serial No. 290,534

6 Claims. (Cl. 74—600)

Our invention may be conveniently utilized in a meter operated by the flow of liquid in any liquid dispensing apparatus, for instance, in dispensation of lubricating oil or gasoline or other fuel oil. However, the essential features of our invention may be utilized in the construction of a fluid meter of the type disclosed in Letters Patent of the United States No. 2,003,901 granted June 4, 1935, to Parker et al. for Improvement in piston meters.

The essential feature of our invention is certain means for adjustably varying the throw of a crank, whereby the length of the stroke of a piston may be varied to vary the amount of fluid passed through the piston cylinder during such stroke.

The form of our invention chosen for illustration is embodied in a positive displacement meter, wherein a crank-shaft is composed of two axially aligned members, one of which has rigidly connected therewith an eccentric crank-pin; which pin carries a bushing fitted for rotary adjustment thereon, which bushing is a sleeve, having a cylindrical outer surface eccentric to the axis of the pin. Said bushing extends through a bearing in one end of a connecting rod, the opposite end of which is pivoted in the piston, and said bushing has at one end thereof, beside said bearing, a gear which is concentric with the axis of the crank-pin and meshes with a gear pinion on the other member of the crank-shaft. Rotary adjustment of the crank-shaft member carrying said pinion effects rotary adjustment of said eccentric bushing, but when adjusted, the axially aligned shaft members, crank-pin, and bushing are so rigidly connected that they may be turned as if they were one piece, to effect reciprocation of the piston. The means for effecting such rigid connection are hereinafter described.

Our invention includes the various novel features of construction, arrangement, and method of operation hereinafter described.

In said drawings, Fig. I is a partly elevational and partly sectional view of a displacement meter conveniently embodying our invention.

Fig. II is a fragmentary sectional view, similar to a lower part of Fig. I, but showing a modification of the means for securing the eccentric bushing in adjusted position.

Fig. III is a fragmentary sectional view taken on the line III, III in Fig. I, in the direction of the arrows on said line.

Fig. IV is an elevation of the lower end of the crank-shaft member which is capable of rotary adjustment, as shown in Fig. I, and showing the adjusting washer engaged therewith.

Fig. V is an edge view of the calibrated collar which is fixed on the sleeve of the crank-shaft member which is rotatably adjustable, as shown in Fig. II.

In said figures, the casing 1 may be of any convenient form having a fluid inlet 2 and outlet 3 for the passage of fluid into and out of the piston chamber 4 in said casing. The crank-shaft member 5 is journaled in the bearing 5' in said casing and has the arm 5$^a$ carrying the eccentric crank-pin 5$^b$. Said pin 5$^b$ carries the bushing 6 fitted for rotary adjustment thereon, which bushing is a sleeve having a cylindrical outer surface 6$^a$ eccentric to the axis of said pin 5$^b$. Said bushing extends through the bearing 7$^a$ in one end of the connecting rod 7, the opposite end 7$^b$ of which is connected with the piston 8 by the pivot 8$^a$ so that it may be reciprocated in said piston chamber 4. Said bushing 6 has at one end thereof, beside said bearing 7$^a$, the gear 6$^b$ which meshes with the gear pinion 10$^a$ on the crank-shaft member 10 which is in axial alignment with the crank-shaft member 5, but separately mounted and supported in a removable bearing which is detachably connected with casing 1, as shown in Fig. I.

The pinion locking plate 11, shown in Fig. I, is slip-fitted on said crank shaft member 10 and has the bifurcated end 11$^a$ slip-fitted on said crank-pin 5$^b$. The crank-shaft member 10$^b$ is a cylindrical sleeve fitted on the crank-shaft member 10 and journaled in the bearings 12 in said casing 1. Said crank-shaft member 10 has the keyway 10$^c$ extending longitudinally therein at the lower end thereof in Fig. I, and engaging the key lug 13$^a$ on the adjusting washer 13 which has, conveniently radially opposite said lug, the notch 13$^b$ for engagement with a spanner wrench, whereby said crank-shaft member 10 may be rotatably adjusted to vary the position of said bushing 6 and thereby vary the effective length of the crank on said crank member 5, without movement of the crank-pin 5$^b$. When said crank-shaft member 10 has been thus turned relatively to the crank-shaft member 5 to effect the desired adjustment; the lock nut 15, which is engaged with the screw thread at the lower end of said crank-shaft member 10 in Fig. I, may be turned by a spanner wrench engaging its radial socket 15$^a$, to rigidly clamp said shaft member 10, pinion locking plate 11, shaft sleeve 10$^b$, and adjusting washer 13 together so that they may be turned as if they were in unitary relation with said crank-shaft member 5 and crank-pin 5b.

The form of our invention shown in Fig. II differs from that shown in Fig. I in that the crank-shaft sleeve 16, which is substituted for the crank-shaft sleeve 10b, is in rigid unitary relation with the pinion locking plate 16a, and has the collar 16b rigidly connected with its lower end, conveniently by the set screw 16c extending into a hole in said sleeve 16. Said sleeve 16 may be held against rotation during adjustment of the bushing 6, shown in Fig. II, by a spanner wrench engaging the radial socket 16d in said collar 16b. As shown in Fig. V, said collar 16b may have a series of graduations or other indicia 16e on its circumference such as to indicate to the operator the position of the bushing 6 on the crank-pin 5b, and the structure shown respectively in Fig. I may be similarly provided with means for determining the relative position of adjustment of the crankshaft members.

It may be observed, that in both forms of our invention illustrated, although the second crankshaft member is normally rigidly maintained in axial alignment with the first crankshaft member 5, and cooperatively connected therewith by the pinion locking plate, (11 or 16a) which serves as a crank arm connecting said shaft member 10 with the crank-pin 5b, said shaft 10 is in fact separate from and axially movable independently of the crank-shaft member 5. Such construction is advantageous in that it facilitates the primary assembling and subsequent adjustment of said crank-shaft member 10 and its appurtenances which are mounted in said removable bearing, which supports them in the casing 1, as shown in Fig. I.

However, we do not desire to limit ourselves to the precise details of construction, arrangement, or method of operation herein set forth, as it is obvious that various modifications may be made therein without departing from the essential features of our invention, as defined in the appended claims.

1. The combination with a crank shaft member having an eccentric crank-pin in rigid relation therewith; of an eccentric bushing sleeve mounted to be adjustably turned on said crank-pin and having a cylindrical outer surface in eccentric relation to the axis of said pin; a piston rod, of invariable effective length, pivotally connected with said bushing sleeve; a gear on one end of said bushing sleeve in concentric relation with the axis of said crank-pin; a second crank shaft member in axial alignment with said first crank shaft member, but separate from and axially movable independently thereof; a gear pinion in rigid relation with said second crank shaft member and in mesh with said gear on the bushing; means at the outer end of said second crank shaft member, for adjustably turning it relatively to said first crank shaft member, for varying the eccentricity of the axis of said bushing sleeve with respect to the common axis of said crank shaft members, including a locking washer having a key lug engaging a keyway in the outer end of said second crank shaft member; and means for clamping said second crank shaft member in rigid relation with said first crank shaft member when adjusted, including a nut on the outer end of said second crank shaft member.

2. The combination with a crank shaft member having an eccentric crank-pin in rigid relation therewith; of an eccentric bushing sleeve mounted to be adjustably turned on said crank-pin and having a cylindrical outer surface in eccentric relation to the axis of said pin; a gear on one end of said bushing sleeve in concentric relation with the axis of said crank-pin; a second crank shaft member in axial alignment with said first crank shaft member, but separate from and axially movable independently thereof; a gear pinion in rigid relation with said second crank shaft member and in mesh with said gear on the bushing; means at the outer end of said second crank shaft member, for adjustably turning it relatively to said first crank shaft member, for varying the eccentricity of the axis of said bushing sleeve with respect to the common axis of said crank shaft members, including a locking washer having a key lug engaging a keyway in the outer end of said second crank shaft member; and means for clamping said second crank shaft member in rigid relation with said first crank shaft member when adjusted, including a nut on the outer end of said second crank shaft member.

3. The combination with a crank shaft member having an eccentric crank-pin in rigid relation therewith; of an eccentric bushing sleeve mounted to be adjustably turned on said crank-pin and having a cylindrical outer surface in eccentric relation to the axis of said pin; a gear on one end of said bushing sleeve in concentric relation with the axis of said crank-pin; a second crank shaft member in axial alignment with said first crank shaft member, but separate from and axially movable independently thereof; a gear pinion in rigid relation with said second crank shaft member and in mesh with said gear on the bushing; means at the outer end of said second crank shaft member, for adjustably turning it relatively to said first crank shaft member, for varying the eccentricity of the axis of said bushing sleeve with respect to the common axis of said crank shaft members; and means for clamping said second crank shaft member in rigid relation with said first crank shaft member when adjusted, including a nut on the outer end of said second crank shaft member.

4. The combination with a crank shaft member having an eccentric crank-pin in rigid relation therewith; of an eccentric bushing sleeve mounted to be adjustably turned on said crank-pin and having a cylindrical outer surface in eccentric relation to the axis of said pin; a piston rod, of invariable effective length, pivotally connected with said bushing sleeve; a gear on one end of said bushing sleeve in concentric relation with the axis of said crank-pin; a second crank shaft member in axial alignment with said first crank shaft member, but separate from and axially movable independently thereof; a gear pinion in rigid relation with said second crank shaft member and in mesh with said gear on the bushing; a pinion locking plate, separate from both crank shaft members, but slip fitted on said second crank shaft member and said crank-pin; means at the outer end of said second crank shaft member, for adjustably turning it relatively to said first crank shaft member and said locking plate, for varying the eccentricity of the axis of said bushing sleeve with respect to the common axis of said crank shaft members, and means for clamping said second crank shaft member in rigid relation with said first crank shaft member and locking plate when adjusted, including a nut on the outer end of said second crank shaft member.

5. A structure as in claim 4; including a sleeve encircling said second crank shaft member in integral relation with said locking plate.

6. A structure as in claim 4; including a sleeve encircling said second crank shaft member in integral relation with said locking plate, and a collar rigidly connected with said crank shaft sleeve, and having means for engaging a wrench; whereby said sleeve may be held against rotation while said second crank shaft member is being rotatably adjusted.

JOSEPH C. WOODFORD.
JOSEPH E. FERNLY.